United States Patent
Lu et al.

(10) Patent No.: US 11,270,721 B2
(45) Date of Patent: Mar. 8, 2022

(54) SYSTEMS AND METHODS OF PRE-PROCESSING OF SPEECH SIGNALS FOR IMPROVED SPEECH RECOGNITION

(71) Applicant: Plantronics, Inc., Santa Cruz, CA (US)

(72) Inventors: Youhong Lu, Irvine, CA (US); Arun Rajasekaran, Saratoga, CA (US)

(73) Assignee: PLANTRONICS, INC., Santa Cruz, CA (US)

( * ) Notice: Subject to any disclaimer, the term of this patent is extended or adjusted under 35 U.S.C. 154(b) by 244 days.

(21) Appl. No.: 16/418,828

(22) Filed: May 21, 2019

(65) Prior Publication Data
US 2019/0355385 A1    Nov. 21, 2019

Related U.S. Application Data

(60) Provisional application No. 62/674,226, filed on May 21, 2018.

(51) Int. Cl.
| | |
|---|---|
| *G10L 25/90* | (2013.01) |
| *G10L 15/22* | (2006.01) |
| *G10L 25/24* | (2013.01) |
| *G06F 3/16* | (2006.01) |

(52) U.S. Cl.
CPC .............. *G10L 25/90* (2013.01); *G10L 15/22* (2013.01); *G10L 25/24* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 5,054,085 A | * | 10/1991 | Meisel | H04R 1/08 704/207 |
| 5,517,595 A | * | 5/1996 | Kleijn | G10L 19/097 704/205 |
| 5,812,972 A | * | 9/1998 | Juang | G10L 15/144 704/234 |
| 5,867,816 A | | 2/1999 | Nussbaum | |
| 5,933,808 A | * | 8/1999 | Kang | G10L 21/04 704/278 |

(Continued)

OTHER PUBLICATIONS

Unknown, "Pitch detection algorithm", Wikipedia, Oct. 5, 2018, 4 pages, retrieved from the internet: URL: https://en.wikipedia.org/w/index.php?title=Pitch_detection_algorithm&oldid=862555057.

(Continued)

*Primary Examiner* — Seong-Ah A Shin
(74) *Attorney, Agent, or Firm* — Slayden Grubert Beard PLLC

(57) ABSTRACT

Pre-processing systems, methods of pre-processing, and speech processing systems for improved Automated Speech Recognition are provided. Some pre-processing systems for improved speech recognition of a speech signal are provided, which systems comprise a pitch estimation circuit; and a pitch equalization processor. The pitch estimation circuit is configured to receive the speech signal to determine a pitch index of the speech signal, and the pitch equalization processor is configured to receive the speech signal and pitch information, to equalize a speech pitch of the speech signal using the pitch information, and to provide a pitch-equalized speech signal.

22 Claims, 7 Drawing Sheets

(56) References Cited

U.S. PATENT DOCUMENTS

| | | | | |
|---|---|---|---|---|
| 6,260,017 B1* | 7/2001 | Das | ............ | G10L 19/18 |
| | | | | 704/265 |
| 7,013,269 B1* | 3/2006 | Bhaskar | ............ | G10L 19/097 |
| | | | | 704/219 |
| 9,135,923 B1* | 9/2015 | Chen | ............ | G10L 25/90 |
| 10,431,236 B2* | 10/2019 | Gloge | ............ | G10L 15/22 |
| 2004/0193405 A1* | 9/2004 | Doran | ............ | G10L 25/90 |
| | | | | 704/207 |
| 2006/0098809 A1* | 5/2006 | Nongpiur | ............ | G10L 21/0364 |
| | | | | 379/406.14 |
| 2007/0174052 A1* | 7/2007 | Manjunath | ............ | G10L 19/22 |
| | | | | 704/219 |
| 2010/0161327 A1* | 6/2010 | Chandra | ............ | G10L 17/02 |
| | | | | 704/235 |
| 2013/0151245 A1* | 6/2013 | Stark | ............ | G10L 25/90 |
| | | | | 704/207 |
| 2016/0027450 A1* | 1/2016 | Gao | ............ | G10L 19/002 |
| | | | | 704/205 |
| 2018/0308508 A1* | 10/2018 | Eyben | ............ | G10L 25/27 |
| 2018/0358023 A1* | 12/2018 | Sasaki | ............ | G10L 19/16 |
| 2019/0304438 A1* | 10/2019 | Qian | ............ | G10L 17/04 |

OTHER PUBLICATIONS

Ye, Hui, and Steve Young, "High quality voice morphing." In *2004 IEEE International Conference on Acoustics, Speech, and Signal Processing*, vol. 1, pp. I-9 through 1-12. IEEE, 2004.

Gurumoorthy, Peramanallur Ranganathan. "LPC based voice morphing." *University of Florida* (2006), 15 pages.

Magimai-Doss, Mathew, Todd A. Stephenson, and Hervé Bourlard. "Using pitch frequency information in speech recognition." In *Eighth European Conference on Speech Communication and Technology*. 2003, 4 pages.

\* cited by examiner

SYSTEMS AND METHODS OF PRE-PROCESSING OF SPEECH SIGNALS FOR IMPROVED SPEECH RECOGNITION

CROSS REFERENCE TO RELATED APPLICATION

This application claims priority to U.S. Provisional Patent Application No. 62/674,226, entitled "Inputs to Automatic Speech Recognition and its Acoustic Model", filed on May 21, 2018 with the United States Patent and Trademark Office, the contents of which are hereby incorporated by reference in their entireties.

FIELD

The present disclosure generally relates to the field of audio processing and in particular to speech recognition.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Speech recognition, also referred to as "automatic speech recognition", or abbreviated "ASR", is increasingly important in our daily life. It is a major technology driver of Internet of Things (IoT) devices and of (smart) voice assistant products for home, office, or even mobile use. In addition to the above, an increasing number of consumer devices obtain ASR or voice assistant functionalities. For example, adding ASR or voice assistant functionality to a traditional headset can form a smart headset ecosystem. Similarly, adding ASR or voice assistant functionality to a television set provides a smart TV set.

With reference to headsets, the integration of ASR could make users in an office environment more productive in their work by, e.g., extracting data, action items, or follow-up information, automatically from conversations. Also, it is conceivable that a smart headset could be provided that has a speech-activated user interface or automatically adjusts acoustic noise cancellation modes based on its usage patterns, the language of its user, etc.

Various technical implementations have been and are employed in speech recognition systems. A majority of modern general-purpose speech recognition systems are based on Hidden Markov Models (HMM), which in essence are statistical models that output a sequence of symbols. HMMs are used in speech recognition because a speech signal can be viewed as a short-time stationary signal. On a short-time scale, speech can be approximated as a stationary process. Thus, speech can be thought of as a Markov model for many stochastic purposes.

Hidden Markov Models (HMM) have been successfully used for handling variable length speech sequences as well as for modeling the temporal behavior of speech signals using a sequence of states that are associated with a probability distribution of observations. Gaussian mixture models (GMM) have been the public model for estimating the probabilistic distribution of speech signals associated with each of these HMM states. In addition, the training methods of GMM-HMM have been well developed for ASR based on the expectation maximization (EM) algorithm.

In addition, a plethora of discriminative training methods are employed to further improve HMM to yield the state-of-the-art in ASR technology.

Recently, HMM models that use artificial neural networks (ANNs) instead of GMMs have shown a significant performance improvement of speech recognition with the use of "deep" learning in an ANN, typically referred to as deep neural networks or DNNs.

Despite the use of GMM, ANN, and/or hybrid approaches for speech recognition, all of them use logarithmic Mel-frequency spectral coefficients (MFSC) with and/or without a decorrelating discrete cosine transform as Mel-frequency cepstral coefficients (MFCC) that were popular with GMMs. MFSCs and also MFCCs are obtained via a fixed set of nonuniform filter-banks.

An issue with Mel-frequency spectral coefficients and Mel-frequency cepstral coefficients exits in that the coefficients are highly speaker-dependent. Thus, the underlying models are quite complex and, in the case neural networks are used, require vast amounts of training data to compensate for the speaker-dependency. In addition, the speaker-dependency generally requires complex algorithms to conduct speech recognition in a neural network, e.g., having a large number of layers and weights to handle these variations.

Accordingly, an object exists to improve existing automatic speech recognition systems.

SUMMARY

The object is solved by pre-processing systems, methods of pre-processing, and speech processing systems according to the independent claims. The dependent claims and the following discussion provide various embodiments.

As the present inventors have ascertained, the speaker-dependence of Mel-frequency spectral coefficients (MFSC) and Mel-frequency cepstral coefficients (MFCC) are primarily based on speech pitch.

Since speech pitch of speakers differs with age, gender, and even emotion, MFSC and MFCC, therefore, vary with these factors. Accordingly, the presence of speech pitch may be problematic in an automatic speech recognition system (ASR) and may hinder a proper determination of linguistic content.

Accordingly, and in one aspect, a pre-processing system for improved speech recognition of a speech signal is provided. The system of this aspect comprises at least a pitch estimation circuit and a pitch equalization processor. The pitch estimation circuit is configured to receive the speech signal and to determine a pitch index of the speech signal. The pitch equalization processor is configured to receive the speech signal and pitch information, equalize a speech pitch of the speech signal using the pitch information, and to provide a pitch-equalized speech signal.

According to another aspect, a pre-processing system for improved speech recognition of a speech signal comprises at least a pitch estimation circuit and a pitch classification processor. The pitch estimation circuit is configured to receive the speech signal and to determine a pitch index of the speech signal. The pitch classification processor is configured to receive pitch information and to determine classification information of the speech signal using the pitch information.

The details of one or more embodiments are set forth in the accompanying drawings and the description below.

Other aspects, features, and advantages will be apparent from the description, drawings, and from the claims.

DETAILED DESCRIPTION

Figure 1:
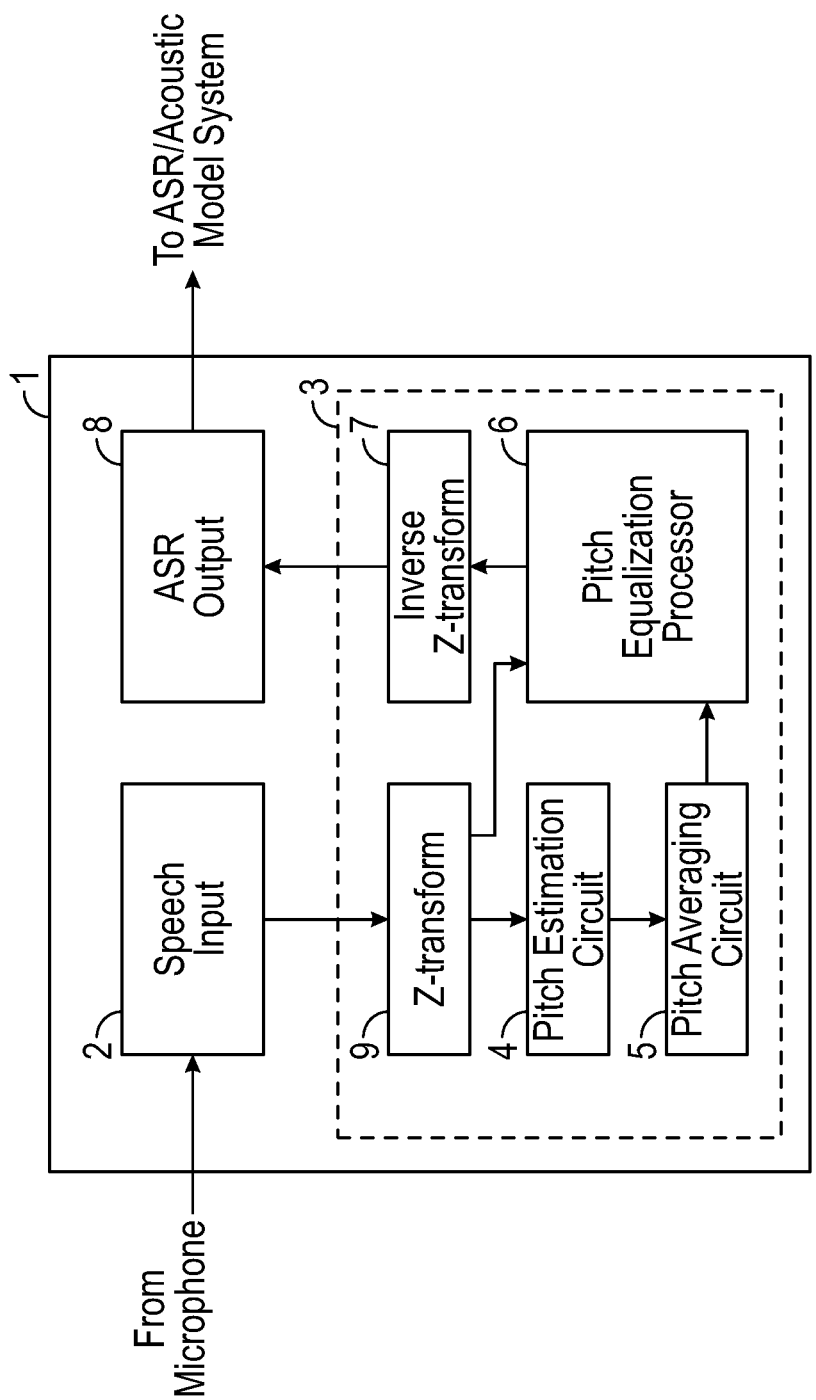
FIG. 1 shows a first embodiment of a pre-processing system for speech recognition in a schematic block diagram.

Specific embodiments of the invention are described in detail below. In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid to unnecessarily complicating the instant description.

In the following explanation of the present invention according to the embodiments described, the terms "connected to" or "connected with" are used to indicate a data and/or audio (signal) connection between at least two components, devices, units, processors, modules, etc. Such a connection may be direct between the respective components, devices, units, processors, or modules; or indirect, i.e., over intermediate components, devices, units, processors, modules, etc. The connection may be permanent or temporary; wireless or conductor based.

For example, a data and/or audio connection may be provided over a direct connection, a bus, or over a network connection, such as a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a Bluetooth network connection and/or a DECT connection is used to transmit audio and/or data.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

Human speech typically comprises voiced and unvoiced speech components. Voiced speech components comprise sounds like vowels, while unvoiced speech includes whispers or sounds like the letter "S". Voiced speech begins in the larynx, which generates a sound signal similar to a pulse train by forcing air between the vocal cords, which in turn slap together and produce a pulsed sound. Speech is generated by moving the mouth and tongue to change the timbre of the voiced sound. The rate at which the vocal cords slap together determines the speech pitch, which in essence is the fundamental period of the voiced speech components. Speech also comprises unvoiced components that use an unmodulated air stream passing through the separated vocal cords of the relaxed larynx.

Many of today's speech recognition systems use Mel-frequency spectral coefficients (MFSC) and Mel-frequency cepstral coefficients (MFCC), which are widely used in the fields of speech and speaker recognition. MFCCs were introduced by Davis and Mermelstein in the 1980's to create filter banks that emphasize on the linguistic content of speech.

As the present inventors have ascertained, the speaker-dependence of MFSCs and MFCCs, used by modern automatic speech recognition systems, are primarily based on speech pitch.

Speech pitch of a speaker differs with age, gender, and even emotion. Mel-frequency spectral coefficients and Mel-frequency cepstral coefficients, therefore, vary with these factors. Speech pitch may convey information about the speaker. Its existence or non-existence can convey information about the type of sound (voiced or unvoiced). And its variation across time can convey prosodic information.

However, speech pitch may be problematic in an automatic speech recognition system (ASR) and may hinder proper determination of linguistic content. Among others, speech pitch affects the estimation of the spectral envelope and the estimation of the spectral peaks that make the standard acoustic features sensitive to changes in speech pitch. It results that an acoustic model for speech recognition highly depends on speech pitch. Therefore, a library of an acoustic model typically is large to cope with pitch variations. Thus, current ASR systems need to be quite complex to obtain a sufficient performance.

In this disclosure, we present systems and methods that are aimed to analyze or modify speech signals, which speech signals are used as an input to automatic speech recognition (ASR) systems or to acoustic model systems for training purposes. Acoustic model systems may comprise one or more acoustic models for an ASR system. In some embodiments, such acoustic models are trained by artificial neural networks or deep neural networks using speech signals and that are used, once trained, for ASR systems.

In essence, the systems and methods discussed herein are aimed at equalizing the effect of one or more of age, gender, and emotion in a speech signal to increase the robustness of the ASR against noises. In some embodiments, an average pitch effect is filtered out of a speech signal and the resulting output is used as an input for an ASR or an acoustic model system. In some embodiments, an average pitch of a speech signal is changed to a fixed pitch and the resulting output is used as an input for an ASR or an acoustic model system. In some embodiments, several (ASR) acoustic models are trained according to ranges of pitches of speech. A model may, e.g., be selected for use in an ASR system corresponding to the estimated pitch of the respective speaker. The aforementioned embodiments provide a significant performance improvement for ASR systems and reduce the complexity of speech recognition algorithms and training systems. The reduced complexity may enable use of ASR offline, or in power constrained and/or computing-capability constrained systems, such as mobile devices and headsets. It is noted that speech pitch may in some embodiments be used in an ASR, namely as side information.

In one aspect, a pre-processing system for improved speech recognition of a speech signal is provided. The system of this aspect comprises at least a pitch estimation circuit and a pitch equalization processor. The pitch estimation circuit is configured to receive the speech signal to determine a pitch index of the speech signal. The pitch equalization processor is configured to receive the speech signal and pitch information, to equalize a speech pitch of the speech signal using the pitch information, and to provide a pitch-equalized speech signal.

In the context of the present discussion, a "speech signal" is understood as a representation of audio as an electric signal comprising speech and/or voice utterances of a user.

An electric signal, also herein referred to as a "signal" or an "audio signal", may be of analog or digital type. For example, the signals described herein may be of pulse code modulated (PCM) type or of any other type of bit stream signal. Each signal may comprise one channel (mono signal), two channels (stereo signal), or more than two channels (multi-channel signal). The signal(s) may be compressed or not compressed. In some embodiments, the speech signal is in frequency domain, i.e., a frequency domain signal, obtained for example by Discrete Fourier Transform (DFT), Fast Fourier Transform (FFT), or Z-transform. In other embodiments, a frequency domain converter is arranged as a part of the pre-processing system, so that the pitch estimation circuit and/or the pitch equalization processor are provided with a frequency domain speech signal.

As discussed in the preceding and according to the present aspect, the speech signal is provided to the pitch estimation circuit and to the pitch equalization circuit. The pitch estimation circuit is configured to determine a pitch index of the speech signal. The pitch index corresponds to the fundamental period of voiced speech components of the speech signal. In the following, the pitch index will also be designated as "N". It follows that the associated fundamental pitch frequency is 1/N. Harmonic frequencies of the voiced speech components are multiple of 1/N, i.e., multiple of the fundamental frequency of the voiced speech components.

It will readily be apparent that the pitch index is zero in case the speech signal does not comprise any voiced speech components.

The pitch estimation circuit may be of any suitable type to determine the pitch index or any related measure of the voiced speech components of the speech signal, such as the fundamental frequency.

In some embodiments, the pitch estimation circuit is configured to apply a pitch estimation/detection algorithm. When using time-domain speech signals, such algorithm may encompass measuring the distance between zero crossing points of the signal, i.e., the zero-crossing rate. Alternatively, the algorithm may be configured to compare segments of the signal with other segments offset by a trial period to find a match. AMDF (average magnitude difference function), ASMDF (Average Squared Mean Difference Function), and other similar autocorrelation algorithms are based on such comparison.

In case of frequency-domain speech signals, it is possible to use the harmonic product spectrum, cepstral analysis, or maximum likelihood, which attempts to match the frequency domain characteristics to pre-defined frequency maps, and the detection of peaks due to harmonic series.

In an exemplary headset application, the speech signal, provided to the pre-processing system may be the output of the Transmit Noise Cancellation block.

The pitch equalization processor of the present aspect is configured to receive the speech signal and also pitch information. The pitch information may be of any suitable type. The pitch information in some embodiments corresponds to the pitch index, as determined by the pitch estimation circuit. In other embodiments, the pitch information corresponds to an average pitch index, which will be explained in more detail in the following.

Using the pitch information, the pitch equalization processor equalizes the speech pitch of the speech signal to obtain a pitch-equalized speech signal. The pitch-equalized speech signal may then and in some embodiments be provided as an input to an automatic speech recognition system and/or as an input to an acoustic model system to allow for improved speech recognition, in particular with systems that use MFSC or MFCC.

One of benefits of the pre-processing system as discussed herein is that the automatic speech recognition system and the acoustic model system, respectively, does not necessarily need to be changed. Any commercially available system may be used, such as available from Nuance Communications, Inc. and Sensory Inc., while enabling the aforementioned improved functionality of the pre-processing systems discussed herein.

It is noted that in some embodiments, the pre-processing system may be connected to or integrated with an automatic speech recognition system and/or an acoustic model system. In some embodiments, the pre-processing system is connected with an automatic speech recognition system and/or an acoustic model system over a network. Alternatively, the pre-processing system may provide the pitch-equalized speech signal to a storage device, so that a corresponding pitch-equalized speech signal file can be written on a storage medium, such as a hard drive, solid state drive, memory, database, optical recording medium, etc., for later use by an automatic speech recognition system and/or an acoustic model system. The latter example allows for an "offline use" of the pre-processing system.

In the present context, the term "to equalize" is understood to comprise any method to reduce, neutralize, and/or eliminate the effect of speech pitch on the speech recognition and/or training of the acoustic model system. Non-limiting examples include filtering or removing speech pitch, or "normalizing" speech pitch to a predefined pitch. Some embodiments are discussed in more detail in the following.

The pitch equalization processor may be of any suitable type. For example and in some embodiments, the pitch equalization processor, the pitch estimation circuit, and/or a pitch averaging circuit may be provided in corresponding dedicated circuitry, which may be integrated or non-integrated. Alternatively and in some embodiments, the pitch equalization processor, the pitch estimation circuit, and/or a pitch averaging circuit may be provided in software, stored in a memory of the pre-processing system, and their respective functionalities are provided when the software is executed on a common or one or more dedicated processing devices, such as one or more CPUs, microcontrollers, or DSPs.

The pre-processing system in further embodiments may comprise additional components. For example, the pre-processing system in some exemplary embodiments may comprise additional control circuitry, additional circuitry to process speech signals, time/frequency domain converters, one or more wireless communications interfaces, a central processing unit, and/or one or more housings.

In some embodiments, the pre-processing system further comprises a pitch averaging circuit. The pitch averaging circuit in some embodiments may be configured to receive the pitch index from the pitch estimation circuit and to determine an average pitch index. Pitch information corresponding to the average pitch index may be provided to the pitch equalization processor in some embodiments.

As will be apparent, a small variation in pitch may occur during speech even from the same speaking person. Thus, it may be beneficial to smooth the determined pitch index from time to time to get an average pitch index and to use the average pitch index for the pitch equalization. Any suitable averaging may be used. For example, a low-pass filter (LPF) or a single-pole filter with a specific time constant may provide averaging. In general, and in some embodiments, any smoothing function with a tunable time constant may be used.

In some embodiments, the pitch equalization processor is configured to equalize by normalizing the speech pitch of the speech signal. In some embodiments, the pitch index of the speech signal is normalized to a predefined speech recognition pitch index, i.e., a predefined pitch index of an associated automatic speech recognition system and/or an acoustic model system. According to the present embodiments, all speech data of the acoustic model will have an almost identical pitch as its training data is normalized to have the common, predefined pitch index. During the speech recognition, the input speech signal may also be normalized to the predefined pitch index, allowing for an improved matching of the input speech signal with the acoustic model and thus improved phoneme detection without the need to have training data with a large variety of different pitches obtained, stored, and analyzed.

In some embodiments, the pitch equalization processor is configured to filter the speech pitch. According to the present embodiments, the pitch equalization processor in essence normalizes the speech pitch to a predefined pitch index of zero.

The pitch equalization processor according to the present embodiments may be configured with a filter circuit or algorithm, having a transfer function suitable for removing the speech pitch.

In some embodiments, the pitch equalization processor is configured to provide the pitch-equalized speech signal to one or more of the automatic speech recognition system and the acoustic model system.

According to another aspect, a method of pre-processing of a speech signal for improved speech recognition is provided. The method comprises the steps of receiving the speech signal, determining a pitch index of the speech signal, equalizing a speech pitch of the speech signal using pitch information, and providing a pitch-equalized speech signal.

In some embodiments, the method further comprises determining the pitch information by calculating an average pitch index from the determined pitch index.

The method of pre-processing of the current aspect may in some embodiments be configured according to one or more of the embodiments, described in the preceding, i.e., with respect to the preceding aspect. Regarding the functionality of the method of pre-processing and the definitions of terms used herein, reference is made to the preceding discussion.

According to another aspect, a speech processing system is provided. The speech processing system comprises at least a pre-processor for improved speech recognition of a speech signal and one or more of a speech recognition processor and an acoustic modeler. The pre-processor comprises at least a pitch estimation circuit and a pitch equalization processor. The pitch estimation circuit is configured to receive the speech signal to determine a pitch index of the speech signal. The pitch equalization processor is configured to receive the speech signal and pitch information, equalize a speech pitch of the speech signal using the pitch information, and to provide a pitch-equalized speech signal to one or more of the speech recognition processor and the acoustic modeler.

The speech recognition processor and the acoustic modeler according to the present aspect may be of any suitable type of compute engine, e.g., a GPU, DSP, Neural Network Processor (NNP), an Application Processor, or an SOC. For example, the speech recognition processor may be a part of an automatic speech recognition system, for example using ANNs or DNNs, to convert speech into text. In some embodiments, the automatic speech recognition system uses Mel-frequency spectral coefficients and/or Mel-frequency cepstral coefficients.

The acoustic modeler may be used to train a speech recognition system, for example one using ANNs or DNNs, as discussed in the preceding. In some embodiments, a headset system is provided with the speech processing system of this aspect.

In the context of this application, the term "headset" refers to all types of headsets, headphones, and other head worn audio playback devices, such as for example circum-aural and supra-aural headphones, ear buds, in ear headphones, and other types of earphones. The headset may be of mono, stereo, or multichannel setup. The headset in some embodiments may comprise an audio processor. The audio processor may be of any suitable type to provide output audio from an input audio signal. For example, the audio processor may be a digital sound processor (DSP).

A "headset system" herein is understood as a system of a headset and a host device, such as a computer, mobile phone, desk phone, tablet, etc., providing some computing capability for conducting ASR.

The pre-processor of the current aspect may in some embodiments be configured according to one or more of the embodiments, described in the preceding, i.e., with respect to the preceding aspects. Regarding the functionality of the components of the speech processing system and the definitions of terms used herein, reference is made to the preceding discussion.

In another aspect, a pre-processing system for improved speech recognition of a speech signal is provided. The pre-processing system of the present aspect comprises at least a pitch estimation circuit and a pitch classification processor. The pitch estimation circuit is configured to receive the speech signal and to determine a pitch index of the speech signal. The pitch classification processor is configured to receive pitch information and to determine classification information of the speech signal, e.g., using the pitch information.

A main idea of the present aspect is to classify the speech signal according to the pitch of the comprised speech, i.e., according to the pitch of the respective speaker. In some embodiments, this allows to train several ASR acoustic models according to pitch ranges. A specific model may then, e.g., be selected for use in ASR corresponding to the estimated pitch of the respective speaker.

The pitch classification processor may be of any suitable type of logic circuitry. For example, the pitch classification processor may be a microcontroller or microprocessor with suitable programming. Alternatively or additionally, the pitch classification processor may comprise dedicated circuitry to provide the functionality discussed herein. The pitch classification processor may comprise integrated and/or discrete circuitry in some embodiments.

As discussed in the preceding, the pitch classification processor determines classification information of the speech signal. The classification information may then and in some embodiments be provided to an automatic speech recognition system and/or to an acoustic model system to allow for improved speech recognition, in particular with systems that use MFSC or MFCC. Any commercially available speech recognition system may be used, such as available from Nuance Communications, Inc. and Sensory Inc., while enabling the aforementioned improved functionality of the pre-processing systems discussed herein.

It is noted that in some embodiments, the pre-processing system may be connected to or integrated with an automatic speech recognition system and/or an acoustic model system. In some embodiments, the pre-processing system is connected with an automatic speech recognition system and/or an acoustic model system over a network. Alternatively, the pre-processing system may provide the classification information to a storage device, so that a corresponding classification file can be written on a storage medium, such as a hard drive, solid state drive, memory, database, optical recording medium, etc., for later use by an automatic speech recognition system and/or an acoustic model system. The latter example allows for an "offline use" of the pre-processing system.

The classification information may be of any suitable type. In some embodiments, the pitch classification processor is setup with multiple pitch (index) bins. The classification processor may in some embodiments further be configured to determine a correlation between one of the pitch bins and the speech signal and to provide the determined correlation as part of the classification information. In other words, the speech signal or at least part thereof may, e.g., be associated with exactly one of the pitch bins. The resulting classification information, comprising the correlation of the speech signal and the respective pitch bin may be used by an ASR or acoustic model system to select one of a plurality of acoustic models.

The number of pitch bins is not limited. In some examples, pitch indexes of 20-300 are segmented into three pitch bins. Certainly, and depending on the complexity of the ASR system, a smaller or higher number of pitch bins may be selected. Some pitch bins may, e.g., have an equal size or may be selected with sizes that differ from each other.

In some embodiments, the pre-processing system further comprises a pitch averaging circuit. The pitch averaging circuit in some embodiments may be configured to receive the pitch index from the pitch estimation circuit and to determine an average pitch index. Pitch information corresponding to the average pitch index may be provided to the pitch classification processor in some embodiments.

As will be apparent, a small variation in pitch may occur during speech even from the same speaking person. Thus, it may be beneficial to smooth the determined pitch index from time to time to get an average pitch index and to use the average pitch index for the pitch equalization. Any suitable averaging may be used. For example, a low-pass filter (LPF) or a single-pole filter with a specific time constant may provide averaging. In general, and in some embodiments, any smoothing function with a tunable time constant may be used.

In some embodiments, the pitch classification processor is configured to provide at least the classification information to one or more of an automatic speech recognition system and an acoustic model system. In some embodiments, the classification information is provided to the automatic speech recognition system and/or acoustic model system together with the associated speech signal.

The pre-processor system of the current aspect may in some embodiments be configured according to one or more of the embodiments, described in the preceding, i.e., with respect to the preceding aspects. Regarding the functionality of the components of the pre-processing system and the definitions of terms used herein, reference is made to the preceding discussion.

In another aspect, a method of pre-processing of a speech signal for improved speech recognition is provided. The method comprises the steps of receiving the speech signal, determining a pitch index of the speech signal, and determining classification information of the speech signal using pitch information.

In some embodiments, the method further comprises determining the pitch information by calculating an average pitch index from the determined pitch index.

The method of pre-processing of the current aspect may in some embodiments be configured according to one or more of the embodiments, described in the preceding, i.e., with respect to the preceding aspect. Regarding the functionality of the method of pre-processing and the definitions of terms used herein, reference is made to the preceding discussion.

In another aspect, a speech processing system is disclosed. The speech processing system comprises a pre-processor for improved speech recognition of a speech signal and one or more of a speech recognition processor and an acoustic modeler. The pre-processor comprises at least a pitch estimation circuit and a pitch classification processor.

The pitch estimation circuit is configured to receive the speech signal to determine a pitch index of the speech signal. The pitch classification processor is configured to receive the pitch information, to determine classification information of the speech signal using the pitch information, and to provide at least the classification information to one or more of the speech recognition processor and the acoustic modeler. In some embodiments, the pre-processor provides both, the classification information and the speech signal to the speech recognition processor and/or the acoustic modeler.

The speech recognition processor and the acoustic modeler according to the present aspect may be of any suitable type of compute engine, e.g., a GPU, DSP, Neural Network Processor (NNP), an Application Processor, or an SOC. For example, the speech recognition processor may be a part of an automatic speech recognition (ASR) system, for example using ANNs or DNNs, to convert speech into text. In some embodiments, the automatic speech recognition system uses Mel-frequency spectral coefficients and/or Mel-frequency cepstral coefficients.

The acoustic modeler may be used to train a speech recognition system, for example one using ANNs or DNNs, as discussed in the preceding. In some embodiments, a headset system is provided with the speech processing system of this aspect.

The pre-processor of the current aspect may in some embodiments be configured according to one or more of the embodiments, described in the preceding, i.e., with respect to the preceding aspects. Regarding the functionality of the components of the speech processing system and the definitions of terms used herein, reference is made to the preceding discussion.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows an embodiment of a pre-processing system 1 for improved speech recognition in a schematic block diagram. The system 1 comprises a speech input 2, which is configured for receiving a time-domain digital speech signal from a connected microphone unit (not shown). The microphone unit may be arranged close to the pre-processing system 1 or remote therefrom.

The speech input 2 is connected with digital signal processor 3 (DSP) for further processing of the received speech signal. In the present embodiment DSP 3 is a programmable processor, also referred to as a "compute engine".

DSP 3 comprises program and data memory (not shown) that when executed, provides the functionality described in the following. Specifically, DSP 3 comprises a Z-transform converter module 9, a pitch estimation circuit 4, a pitch averaging circuit 5, a pitch equalization processor 6, and an inverse Z-transform converter module 7.

The speech signal received by speech input 2 is provided to Z-transform module 9 to obtain a frequency-domain speech signal. The frequency-domain speech signal is then provided to pitch estimation circuit 4 and pitch equalization processor 6.

The pitch estimation circuit 4 determines the pitch index of the speech signal, i.e., corresponding to the fundamental period of voiced speech components of the speech signal. In the present embodiment, the pitch estimation circuit 4 is configured for cepstral analysis to obtain the pitch index N.

To recall, speech may comprise voiced and unvoiced components. The air that comes out of the lungs of a speaker passes through the vocal tract and comes out of the mouth and the nose to obtain a continuous speech signal. The air coming out of lungs is either sent directly to the vocal tractor or altered using the vocal cord vibrations before sending to the vocal tract. The speech signals with vocal cord vibrations are known as voiced speech signals or voiced speech components. The speech signals without the vocal cord vibrations are known as unvoiced speech signals or unvoiced speech components. The velum is used to close the nose path so that the speech signal is coming out only through the mouth. The vocal tract path is adjusted using tongue and velum to produce different speech signals. Thus lung, vocal cord, vocal tract, tongue, velum, mouth and nose are the integral parts that produce the overall speech signal of a speaker.

Summarizing, the major components in speech production are (1) lung producing noise-like sound, (2) vocal cord producing voiced speech, and (3) vocal track producing short-team meaningful words.

The resulting speech signal can be described as the output of a linear filtering system whose excitation and system response vary slowly with time. The speech signal of a speaker thus may mathematically be expressed in Z-domain as $$s(z)=F(z)L(z)E(z), \tag{1}$$

wherein s(z) is speech signal, E(z) is noise-like signal from lung, L(z) is the vocal cord filter, also referred to as "pitch filter" producing harmonics in speech, and F(z) is called synthesis filter producing short-term meaningful words.

In the present explanation, it is focused on L(z), which can be described as an all-poles filter in the form $$L(z) = \frac{1}{1 - \beta z^{-N}}, \tag{2}$$

in which $\beta$ is a constant of typically slightly less than 1 and N is the pitch index. Note that N can be a fraction number. The harmonic frequencies of voiced speech are multiples of 1/N, the latter of which is referred to as fundamental frequency.

For completeness, it is noted that the synthesis filter F(z) is another all-poles filter in the form $$F(z) = \frac{1}{1 - A(z)}, \tag{3}$$

in which A(z) is a commonly referred to prediction filter $$A(z)=\Sigma_{i=1}^{P} a_i z^{-i}, \tag{4}$$

$\{a_i, 1 \le i \le p\}$ is the set of prediction coefficients, in which p is the prediction order and is usually chosen as 10.

Once the pitch index N is determined by the pitch estimation circuit 4, an average pitch index is determined by the pitch averaging circuit 5 to compensate for fluctuations in the speaker's pitch. Since the pitch index N may be varying during speech, e.g., to reflect emphasis of a sentence, this variation may be kept for a sentence recognition. The variation of pitch typically is small for a particular person and may be around contour. Thus, the pitch averaging circuit 5 smoothes the pitch index to get the average pitch index. The average pitch index is also referred to in this embodiment as "pitch information". Pitch averaging circuit 5 in this embodiment comprises a single-pole filter with a configurable time constant. In most applications, the time constant is chosen between 1 and 200 milliseconds.

The average pitch index is provided to the pitch equalization processor 6. As mentioned in the preceding, the pitch equalization processor 6 is also provided with the frequency-domain speech signal.

The pitch equalization processor 6 is configured to remove the effect of the pitch of the speech signal. A pitch-equalized speech signal is correspondingly provided to the ASR output 8, i.e., to a connected automatic speech recognition system and/or an acoustic model system.

As discussed in the preceding, speech pitch of a speaker differs with age, gender, and even emotion. Mel-frequency spectral coefficients and Mel-frequency cepstral coefficients, therefore, vary with these factors. Speech pitch may convey information about the speaker. Its existence or non-existence can convey information about the type of sound (voiced or unvoiced). And its variation across time can convey prosodic information.

However, speech pitch is not beneficial for an automatic speech recognition system (ASR), i.e., for determining linguistic content. To the contrary, it increases complexity and reduces the performance of an ASR system. The pitch-equalized speech signal reduces the complexity and increases the performance of an ASR system, as will be explained in further detail in the following.

In the present embodiment, the pitch equalization processor 6 is configured to filter out the average pitch, as determined by the pitch averaging circuit 5. Since the speech signal is in Z-domain, pitch filtering may be conducted by dividing L(z) in both side of equation 1 and replacing L(z) with right side of equation 2. It follows that $$(1-\beta z^{-N})s(z)=F(z)E(z) \quad (5)$$

The pitch-equalized speech signal corresponds to the right side of equation 5, which is not pitch-dependent. The left side of equation 5 can be calculated easily using the inputs of the pitch equalization processor, namely pitch information and frequency-domain speech signal. It is noted that instead of the "true" instant pitch index N, the average pitch index, provided by the pitch averaging circuit 5 is used.

The resulting pitch-equalized speech signal may be used in an automatic speech recognition system and/or an acoustic model system, the latter of which may serve to obtain an acoustic model for the automatic speech recognition system.

Figure 2A:
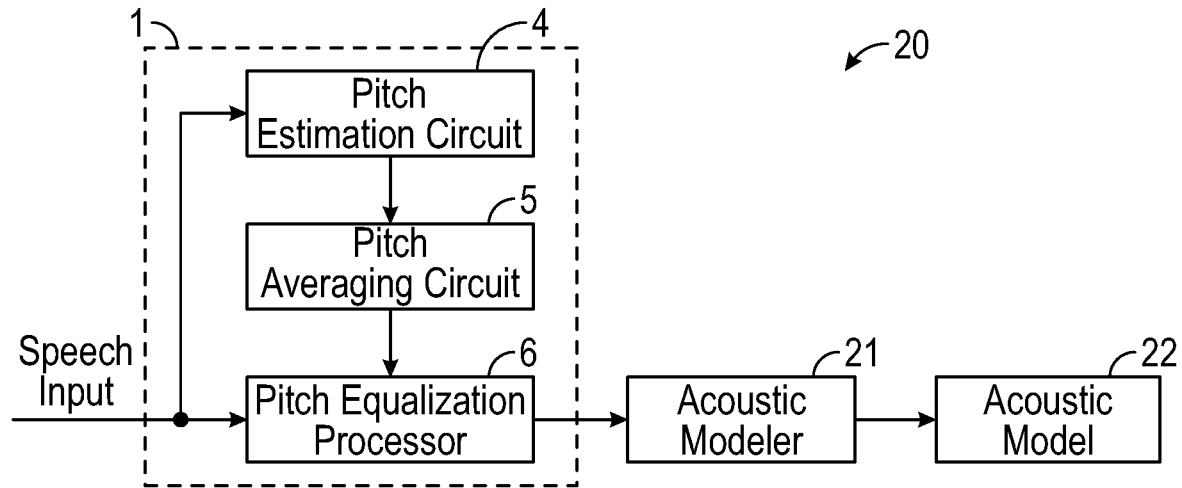
FIG. 2A shows a schematic block diagram of an embodiment of a speech processing system with the pre-processing system of FIG. 1.

FIG. 2A shows a block diagram of a corresponding embodiment of a speech processing system 20. As will be apparent, the speech processing system 20 comprises the pre-processing system 1 of FIG. 1 and an acoustic modeler 21. Correspondingly, the speech processing system 20 is an ASR acoustic model system. It is noted that for clarity, not all of the components of pre-processor 1 of FIG. 1 are shown in FIGS. 2A and 2B.

A speech signal is input to the pre-processing system 1, as described in the preceding. The pre-processing system 1 provides a pitch-equalized, or more precisely, pitch-filtered speech signal to the acoustic modeler 21. The acoustic modeler 21 conducts speech modeling via DNN, HMM, hybrid approaches, or any other suitable method. A corresponding "pitch-equalized" acoustic model 22 results.

As will be apparent to one skilled in the art, the acoustic modeler 21 may comprise an ASR input feature-set, as known in the art that is trained. The feature-set, for example, can be MFCC or MFSC. These features will be used to train the ASR acoustic model 22. For example, the acoustic model can be a DNN where weights and shifts are trained.

Figure 2B:
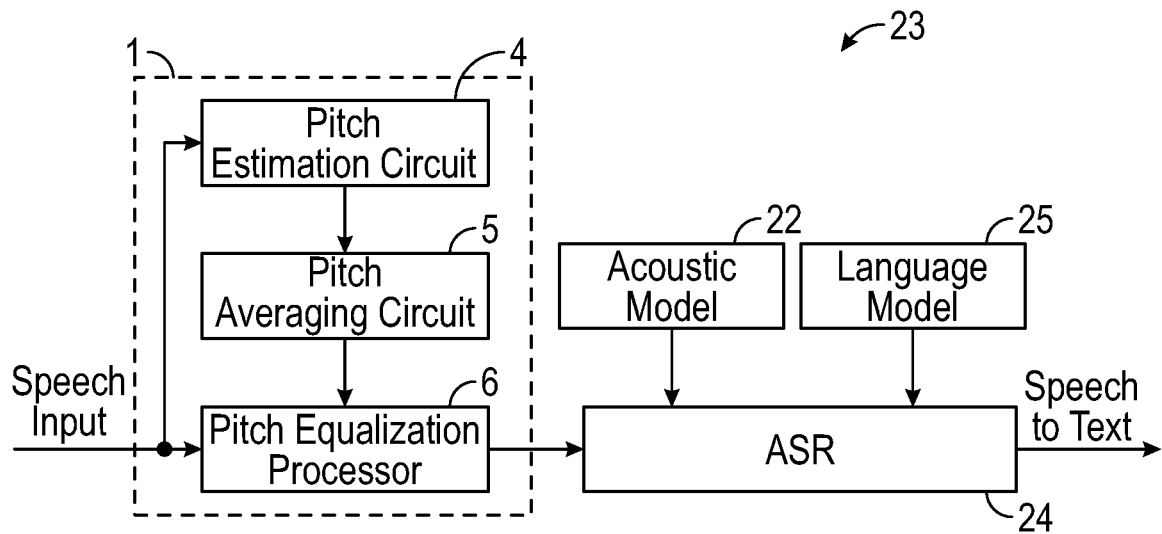
FIG. 2B shows a schematic block diagram of another embodiment of a speech processing system with the pre-processing system of FIG. 1.

Once the pitch-equalized acoustic model 22 is sufficiently trained, it can be used in an automatic speech recognition system 23 as shown in the exemplary and schematic block diagram of FIG. 2B.

Again, the pre-processor 1 of FIG. 1 is used to obtain a pitch-equalized speech signal as an input to the ASR. A speech recognition processor 24 as known in the art is used for obtaining phonemes using the pitch-equalized acoustic model 22 and a language model 25. In general, the pitch-equalized speech signal is analyzed using the acoustic model 22. The acoustic model 22 is the acoustic model 22, trained during speech modeling, as discussed in the preceding with reference to FIG. 2A. Using the acoustic model 22, a phoneme probability is generated. Due to significant phonetic variations between different languages and accents within the same language, language model 25 is used to refine the phoneme probability. A word (phone, sentence) corresponding to higher probability is chosen and provided as a text string output.

Figure 3:
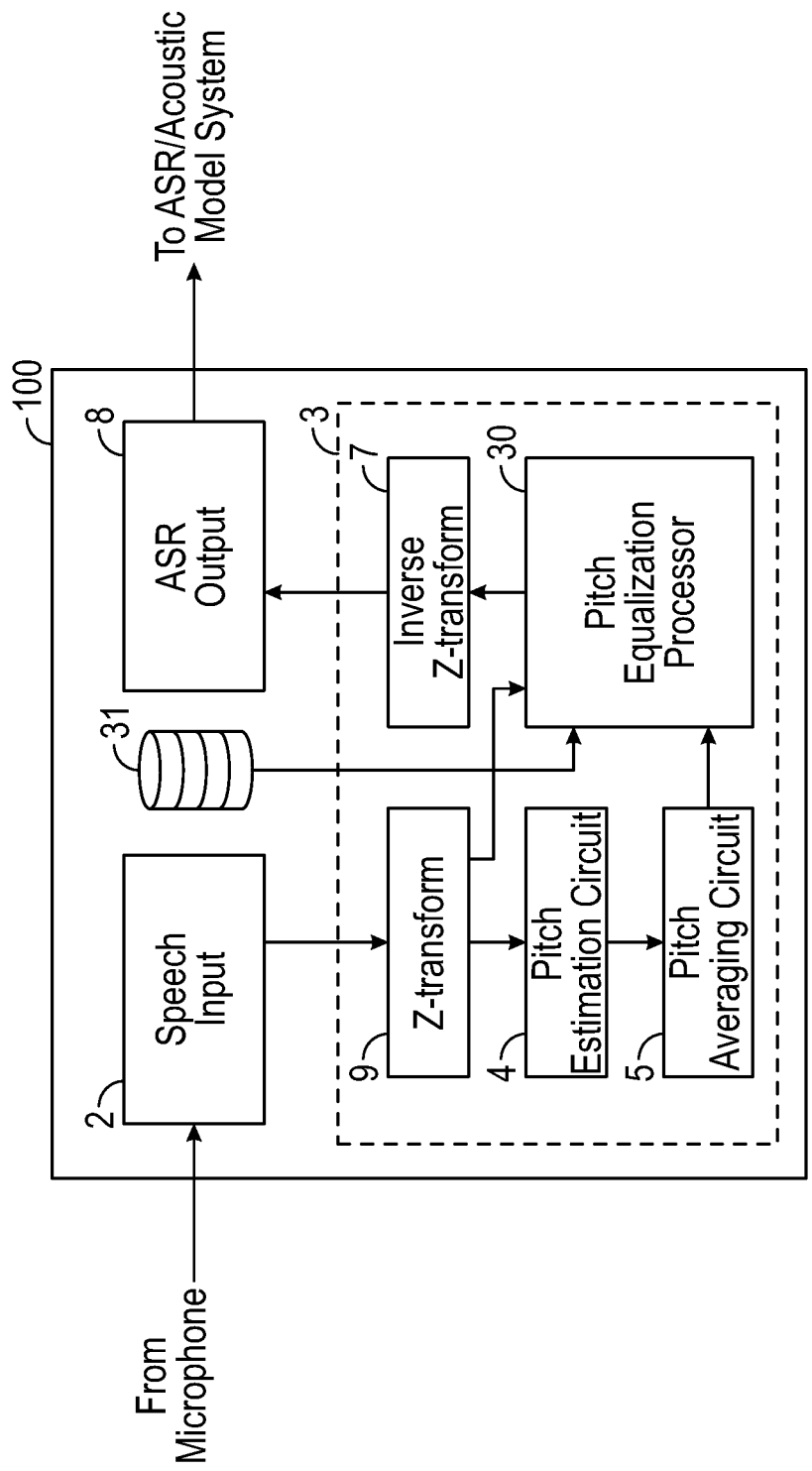
FIG. 3 shows a further embodiment of a pre-processing system for speech recognition in a schematic block diagram.

FIG. 3 shows a further embodiment of a pre-processing system 100 in a schematic block diagram. The pre-processing system 100 of FIG. 3 corresponds to the pre-processing system 1 of FIG. 1 with the exception of pitch equalization processor 30 and an added memory 31.

In the present embodiment, the pitch equalization processor 30 is configured to normalize the pitch index of the speech signal to a predefined speech recognition pitch index $N_0$, i.e., to a defined pitch index, stored in memory 31.

The processing of the pitch equalization processor 30 according to the present embodiment can be described using the Z-domain representation of speech (see equation 1) as:

$$\frac{(1-\beta z^{-N})}{(1-\beta z^{-N_0})}s(z) = \frac{F(z)E(z)}{(1-\beta z^{-N_0})}, \quad (6)$$

wherein on the basis of equation 5, the normalization $(1-\beta z^{-N_0})$ was applied on both sides.

In essence, the functionality of pitch equalization processor 30 according to the present embodiment can be described as removing the pitch of the speech signal and re-synthesizing it with the predefined speech recognition pitch index $N_0$. According to the right side of equation 6, a fixed pitch filter with pitch index $N_0$ is applied after the average pitch is inverse-filtered. This is equivalent to processing the speech signal to have a fixed pitch $N_0$.

Figure 4A:
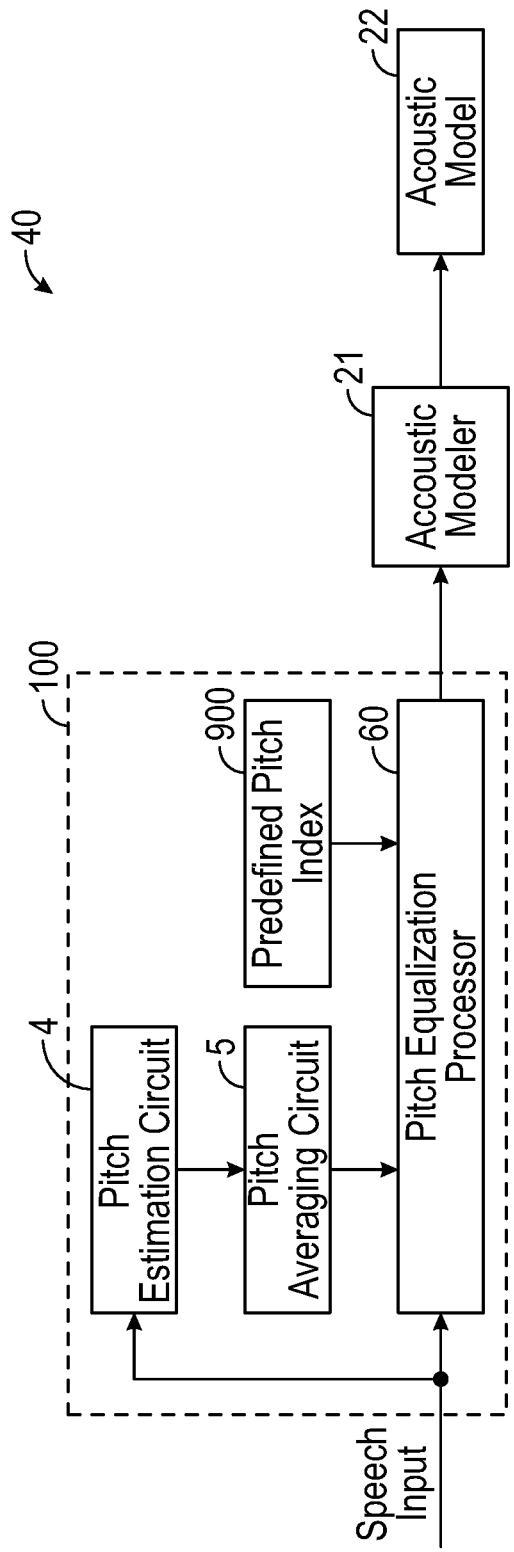
FIG. 4A shows a schematic block diagram of an embodiment of a speech processing system with the pre-processing system of FIG. 3.
Figure 4B:
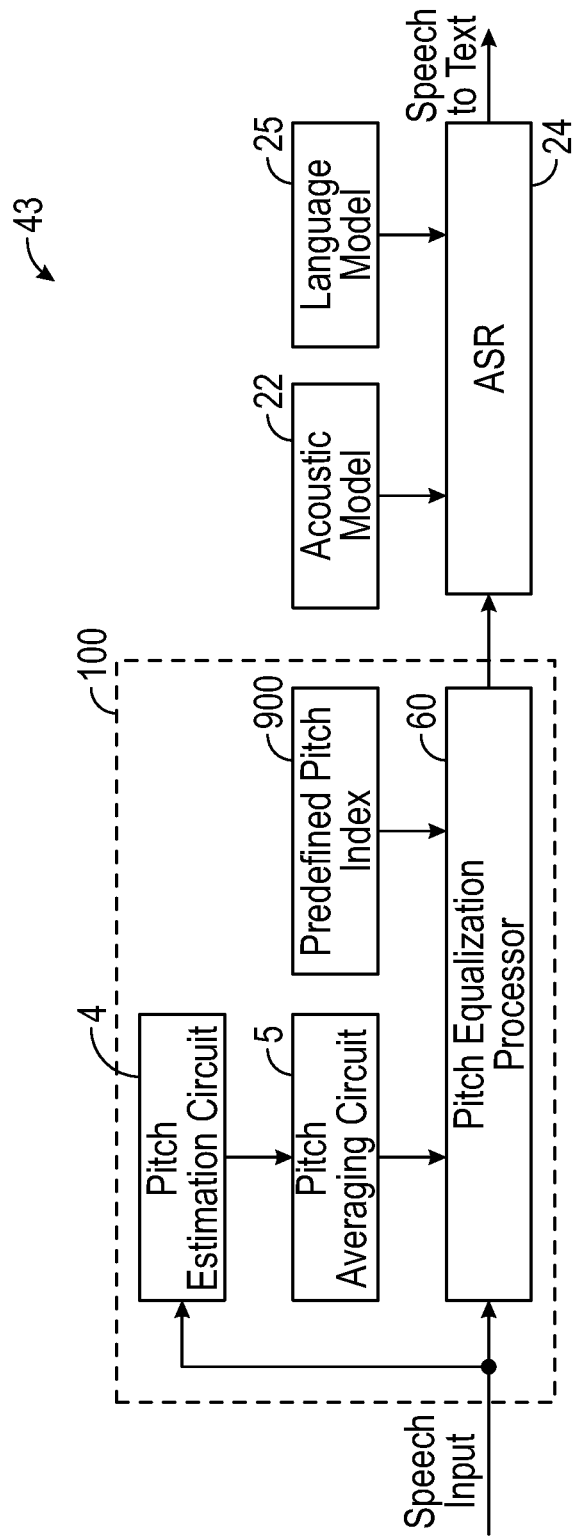
FIG. 4B shows a schematic block diagram of another embodiment of a speech processing system with the pre-processing system of FIG. 3.

FIGS. 4A and 4B show the application of the pre-processing system 100 in an acoustic model system and an automatic speech recognition system, respectively.

FIG. 4A shows a schematic block diagram of an embodiment of an acoustic modeling system 40 using the pre-processing system 100 of FIG. 3. FIG. 4B shows a schematic block diagram of an embodiment of an automatic speech recognition system 43 using the pre-processing system 100 of FIG. 3. Except the use of pre-processing system 100, the acoustic modeling system 40 and the automatic speech recognition system 43 correspond to the embodiments, shown in FIGS. 2A and 2B.

Since the speech modeling is conducted with a fixed pitch, the acoustic model essentially is speaker independent, so that the complexity of the acoustic model 22 is reduced and the speech recognition is more robust. In all of the aforementioned embodiments of FIGS. 1-4, standard acoustic modeling systems and automatic speech recognition systems may be used, which is particularly cost effective.

Figure 5:
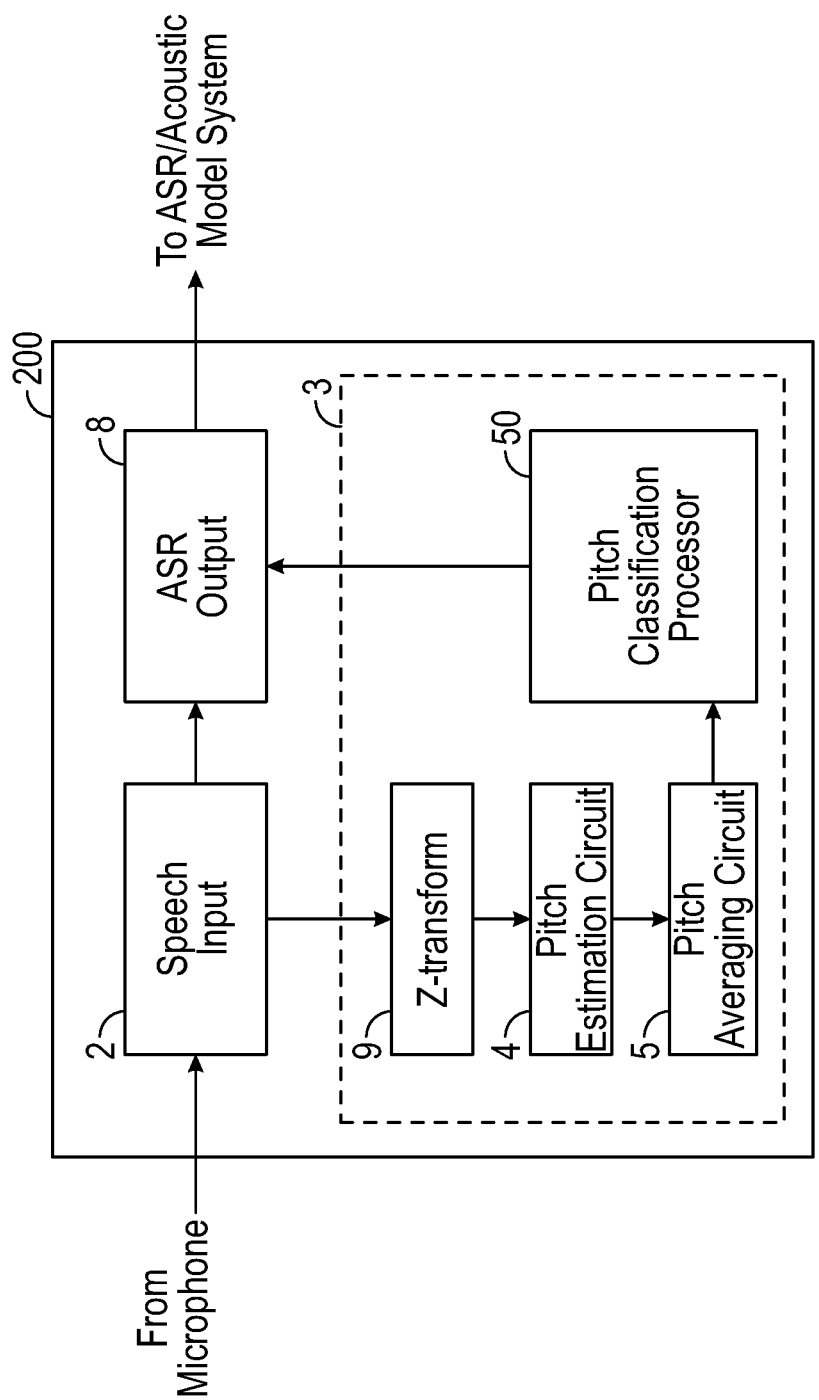
FIG. 5 shows a further embodiment of a pre-processing system for speech recognition in a schematic block diagram.

FIG. 5 shows a further embodiment of a pre-processing system 200 for speech recognition in a schematic block diagram. The pre-processing system 200 corresponds to the pre-processing system 1 of FIG. 1 with the exception that the pitch equalization processor 6 is replaced with pitch classification processor 50 and that inverse Z-transform converter module 7 is removed.

A difference between the embodiment of pre-processing system 200 of FIG. 5 and the embodiments of FIGS. 1-4 is that in this embodiment, no pitch-equalized speech signal is output by the pre-processing system 200. The ASR output 8 is provided using the unchanged speech signal as received by speech input 2. ASR output 8 further receives classification information from the pitch classification processor 50.

Processor 50 is configured with multiple pitch bins or pitch ranges. In the present embodiment, the pitch classification processor 50 is configured with three pitch bins that cover pitch indexes from 20 to 300.

Comparable to the preceding embodiments, pitch estimation circuit 4 and pitch averaging circuit 5 provide an average pitch index of the speech signal to the pitch classification processor 50, which then determines, in which of the three pitch bins the average pitch index of the speech index falls. It is noted that the pitch bins are non-overlapping and thus mutually exclusive, i.e., a single bin is selected for any pitch index from 20 to 300.

The resulting classification information is provided to the ASR output 8 and thus provided to a connected acoustic model system and/or a connected automatic speech recognition system together with the speech signal.

Figure 6A:
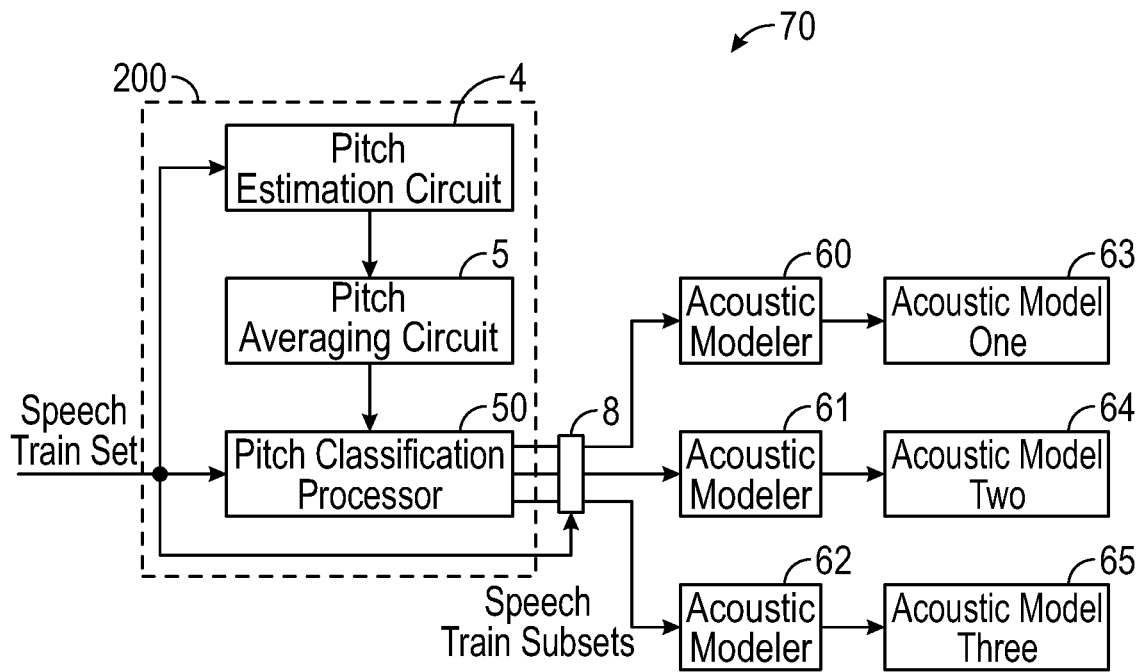
FIG. 6A shows a schematic block diagram of an embodiment of a speech processing system with the pre-processing system of FIG. 5.

FIG. 6A shows a schematic block diagram of an embodiment of an acoustic modeling system 70 using the pre-processing system 200 of FIG. 5. The acoustic modeling system 70 corresponds to the acoustic modeling system 20 of FIG. 2A with the exception that three acoustic modelers 60, 61, 62 are present, which acoustic modelers 60, 61, 62 train three acoustic models 63, 64, 65. The three acoustic models 63, 64, 65 are associated to the three pitch bins, so that each of the acoustic models 63, 64, 65 covers a predefined pitch index range. The acoustic modelers 60, 61, 62 may be of identical or different type, i.e., may use the same or different training feature sets.

While in the embodiment of FIG. 6A, three acoustic models 63, 64, 65 result, no change of the pitch of the speech signal is necessary, thus reducing the necessary computational power of the pre-processor 200. The traditional and existing training methods are usable, but with less complexity.

Figure 6B:
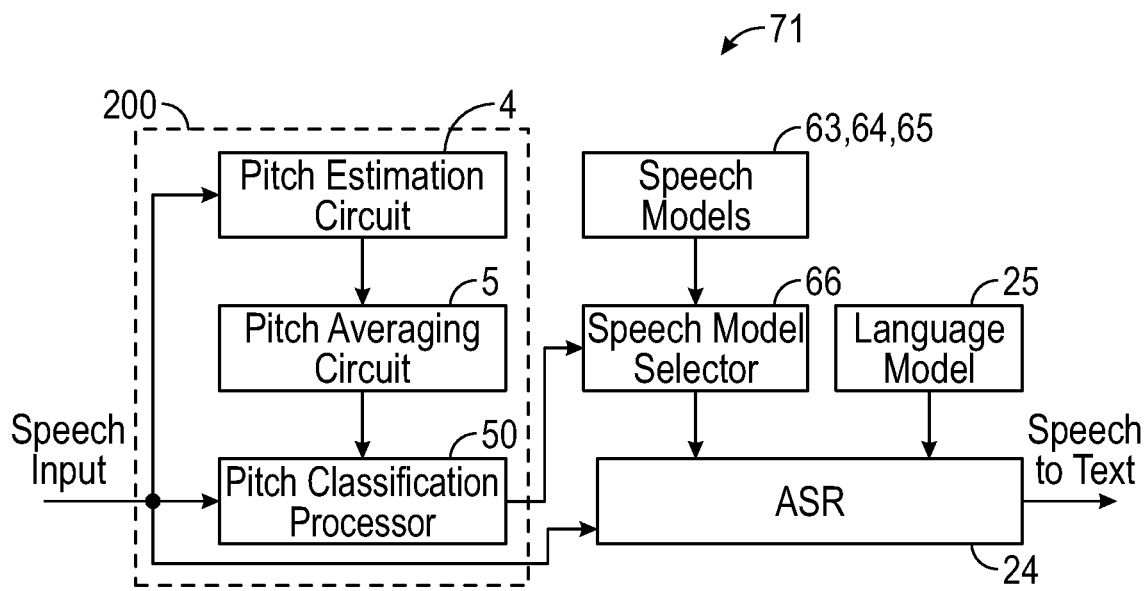
FIG. 6B shows a schematic block diagram of another embodiment of a speech processing system with the pre-processing system of FIG. 5.

FIG. 6B shows a schematic block diagram of an embodiment of an automatic speech recognition system 71 using the pre-processing system 200 of FIG. 5.

The embodiment of FIG. 6B corresponds to the embodiment of FIG. 2B with the exception of an additional speech model selector 66 and the presence of the three acoustic models 63, 64, 65. The speech model selector 66 receives the classification information from the pitch classification processor 50 and selects the appropriate acoustic model 63, 64, 65 depending on the pitch index of the speech signal.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of three acoustic models 63, 64, 65 in FIGS. 6A and 6B, a higher or lower number of acoustic models is used, the acoustic model system 20, 40, 70 is integrated with a headset, the automatic speech recognition system 23, 43, 71 is integrated with a headset, and/or DSP 3, instead of being an Digital Signal Processor, is another compute engine, such as one comprising one or more Graphical Processor Units (GPUs), Micro-controller Units (MCUs), Application Processors, SoCs, and/or Neural Network Processors (NNPs).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A pre-processing system for improved speech recognition of a speech signal, the system comprising at least
a pitch estimation circuit; and
a pitch equalization processor; wherein
the pitch estimation circuit is configured to receive the speech signal to determine a pitch index of the speech signal; and wherein
the pitch equalization processor is configured to
receive the speech signal and pitch information;
equalize a speech pitch of the speech signal using the pitch information through removal of the speech pitch of the speech signal and re-synthesis of the speech pitch of the speech signal with a predefined speech recognition pitch index; and to
provide a pitch-equalized speech signal.

2. The pre-processing system of claim 1, further comprising a pitch averaging circuit; which pitch averaging circuit is configured to receive the pitch index from the pitch estimation circuit, to determine an average pitch index, and to provide the pitch information to the pitch equalization processor, which pitch information corresponds to the average pitch index.

3. The pre-processing system of claim 1, wherein the pitch equalization processor is configured to equalize by normalizing the speech pitch of the speech signal.

4. The pre-processing system of claim 3, wherein the pitch equalization processor is configured to normalize the speech pitch of the speech signal to the predefined speech recognition pitch index.

5. The pre-processing system of claim 1, wherein the pitch equalization processor is configured to filter the speech pitch.

6. The pre-processing system of claim 1, wherein the pitch equalization processor is configured to provide the pitch-equalized speech signal to one or more of an automatic speech recognition system and an acoustic model system.

7. A method of pre-processing of a speech signal for improved speech recognition, comprising the steps of
receiving the speech signal;
determining a pitch index of the speech signal;
equalizing a speech pitch of the speech signal using pitch information through removal of the speech pitch of the speech signal and re-synthesis of the speech pitch of the speech signal with a predefined speech recognition pitch index; and
providing a pitch-equalized speech signal.

8. The method of claim 7, further comprising determining the pitch information by calculating an average pitch index from the determined pitch index.

9. A speech processing system, comprising
a pre-processor for improved speech recognition of a speech signal; and
one or more of a speech recognition processor and an acoustic modeler; wherein
the pre-processor comprising at least
a pitch estimation circuit; and
a pitch equalization processor; wherein
the pitch estimation circuit is configured to receive the speech signal to determine a pitch index of the speech signal; and wherein
the pitch equalization processor is configured to receive the speech signal and pitch information;
to equalize a speech pitch of the speech signal using the pitch information through removal of the speech pitch of the speech signal and re-synthesis of the speech pitch of the speech signal with a predefined speech recognition pitch index; and to
provide a pitch-equalized speech signal to one or more of the speech recognition processor and the acoustic modeler.

10. A headset system with a speech processing system of claim 9.

11. A pre-processing system for improved speech recognition of a speech signal, the system comprising at least
a pitch estimation circuit; and
a pitch classification processor; wherein
the pitch estimation circuit is configured to:
receive the speech signal to determine a pitch index of the speech signal;
to equalize a speech pitch of the speech signal using the pitch information through removal of the speech pitch of the speech signal and re-synthesis of the speech pitch of the speech signal with a predefined speech recognition pitch index; and wherein
the pitch classification processor is configured to
receive pitch information; and to
determine classification information of the speech signal using the pitch information.

12. The pre-processing system of claim 11, further comprising a pitch averaging circuit; which pitch averaging circuit is configured to receive the pitch index from the pitch estimation circuit, to determine an average pitch index, and to provide the pitch information corresponding to the averaged pitch index to the pitch classification processor.

13. The pre-processing system of claim 11, wherein the pitch classification processor is configured with multiple pitch bins and is configured to determine the classification information by determining a correlation between one of the pitch bins and the speech signal.

14. The pre-processing system of claim 13, wherein each pitch bin is associated with one of a plurality of acoustic models of an automatic speech recognition system.

15. The pre-processing system of claim 11, wherein the pitch classification processor is configured to provide at least the classification information to one or more of an automatic speech recognition system and an acoustic model system.

16. A method of pre-processing of a speech signal for improved speech recognition, comprising the steps of
receiving the speech signal;
determining a pitch index of the speech signal;
equalizing a speech pitch of the speech signal using the pitch information through removal of the speech pitch of the speech signal and re-synthesis of the speech pitch of the speech signal with a predefined speech recognition pitch index; and determining classification information of the speech signal using pitch information.

17. The method of claim 16, further comprising determining the pitch information by calculating an average pitch index from the determined pitch index.

18. A speech processing system, comprising
a pre-processor for improved speech recognition of a speech signal; and
one or more of a speech recognition processor and an acoustic modeler; wherein
the pre-processor comprising at least
a pitch estimation circuit configured to equalize a speech pitch of the speech signal using the pitch information through removal of the speech pitch of the speech signal and re-synthesis of the speech pitch of the speech signal with a predefined speech recognition pitch index; and
a pitch classification processor; wherein
the pitch estimation circuit is configured to receive the speech signal to determine a pitch index of the speech signal; and wherein
the pitch classification processor is configured to
receive pitch information;
determine classification information of the speech signal using the pitch information; and to
provide the classification information to one or more of the speech recognition processor and the acoustic modeler.

19. A headset system with a speech processing system of claim 18.

20. The pre-processing system of claim 1, wherein the pitch index is of a fundamental frequency.

21. The pre-processing system of claim 1, wherein the pitch estimation circuit is further configured to equalize the speech pitch of the speech signal using the pitch information through application of a fixed pitch filter with the predefined speech recognition pitch index after an average pitch is inverse-filtered.

22. The pre-processing system of claim 1, wherein the pitch estimation circuit is further configured to equalize the speech pitch to have a fixed pitch.

* * * * *